(12) United States Patent
Takizawa

(10) Patent No.: US 7,010,481 B2
(45) Date of Patent: Mar. 7, 2006

(54) METHOD AND APPARATUS FOR PERFORMING SPEECH SEGMENTATION

(75) Inventor: Takuya Takizawa, Tokyo (JP)

(73) Assignee: NEC Corporation, Tokyo (JP)

( * ) Notice: Subject to any disclaimer, the term of this patent is extended or adjusted under 35 U.S.C. 154(b) by 618 days.

(21) Appl. No.: 10/107,670

(22) Filed: Mar. 27, 2002

(65) Prior Publication Data

US 2002/0143538 A1   Oct. 3, 2002

(30) Foreign Application Priority Data

Mar. 28, 2001   (JP)   ............................. 2001-091561

(51) Int. Cl.
G10L 19/04 (2006.01)
G10L 19/14 (2006.01)
G10L 15/14 (2006.01)

(52) U.S. Cl. .................. 704/220; 704/211; 704/254

(58) Field of Classification Search ................ 704/236, 704/254, 258, 210, 215, 220
See application file for complete search history.

(56) References Cited

U.S. PATENT DOCUMENTS

| | | | | |
|---|---|---|---|---|
| 5,307,442 A | * | 4/1994 | Abe et al. .................... | 704/270 |
| 5,655,058 A | * | 8/1997 | Balasubramanian et al. ..... | 704/255 |
| 5,732,394 A | * | 3/1998 | Nakadai et al. .............. | 704/255 |
| 5,862,519 A | * | 1/1999 | Sharma et al. ............... | 704/231 |
| 5,970,452 A | * | 10/1999 | Aktas et al. ................. | 704/253 |
| 6,055,495 A | * | 4/2000 | Tucker et al. ................ | 704/210 |
| 6,208,967 B1 | * | 3/2001 | Pauws et al. ................ | 704/256 |
| 6,546,369 B1 | * | 4/2003 | Buth et al. ................... | 704/275 |
| 6,618,699 B1 | * | 9/2003 | Lee et al. .................... | 704/209 |
| 2002/0010575 A1 | * | 1/2002 | Haase et al. ................. | 704/205 |
| 2003/0009333 A1 | * | 1/2003 | Sharma et al. .............. | 704/246 |

FOREIGN PATENT DOCUMENTS

JP   64-44492   2/1999

OTHER PUBLICATIONS

Sukkar, R.A.; Herman, S.M.; Setlur, A.R.; Mitchell, C.D.; Reducing computational complexity and response latency through the detection of contentless frame Acoustics, Speech, and Signal Processing, 2000. ICASSP '00. vol. 6, Jun. 5-9, 2000 Page(s):3751.*

A Silence/Noise/Music/speech Splitting Algorithm, C. Montacie, et al,□□LIP6—University Pierre et Marie Curie 4, place Jussieu—75252 Paris cedex□□05—France.*

Svendsen, T.; Soong, F.; "On the automatic segmentation of speech signals" □□Acoustics, Speech, and Signal Processing, IEEE International Conference on ICASSP '87.□□vol. 12, Apr. 1987 Page(s):77 - 80.*

\* cited by examiner

Primary Examiner—W. R. Young
Assistant Examiner—Matthew J Sked
(74) Attorney, Agent, or Firm—Katten Muchin Rosenman LLP

(57) ABSTRACT

In a method for performing a segmentation operation upon a synthesizing speech signal and an input speech signal, a synthesized speech signal and a speech element duration signal are generated from the synthesizing speech signal A first feature parameter is extracted from the synthesized speech signal, and a second feature parameter is extracted from the input speech signal. A dynamic programming matching operation is performed upon the second feature parameter with reference to the first feature parameter and the speech element duration signal to obtain segmentation points of the input speech signal.

16 Claims, 14 Drawing Sheets

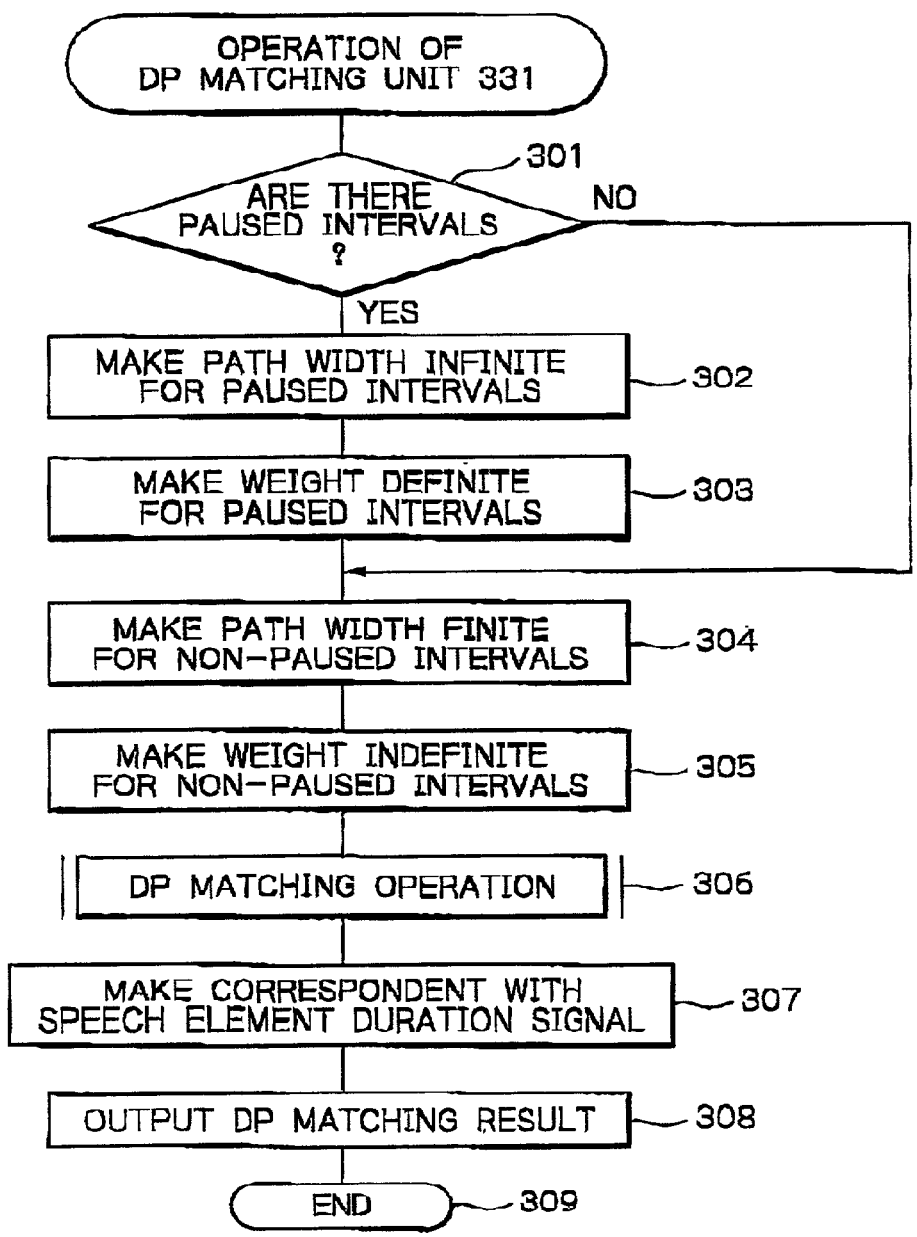

METHOD AND APPARATUS FOR PERFORMING SPEECH SEGMENTATION

BACKGROUND OF THE INVENTION

1. Field of the Invention

The present invention relates to a method and apparatus for performing a speech segmentation upon an unknown speech signal using a known speech signal.

2. Description of the Related Art

In a first prior art speech segmentation apparatus, a feature parameter is extracted from an input speech signal. Then, segmentation points of speech elements are determined by detecting changes in the feature parameter (see: JP-A-64-44492).

In the above-described first prior art speech segmentation apparatus, however, if each change of the feature parameter is small, it is impossible to detect such a change, so that the performance of determination of segmentation points deteriorates.

In a second prior art speech segmentation apparatus, if the sequence of speech elements of an input speech signal is known, segmentation points of the speech elements of the input speech signal are determined by visually comparing the feature parameter thereof with that of a known speech signal.

In the above-described second prior art speech segmentation apparatus, however, since the determination of segmentation points is visually carried out, the cost therefor is increased. Also, if a paused interval is included in the known speech signal, an input speech signal is also generated by introducing a paused interval in a voice, which would trouble a person who speaks to generate the voice. Further, since some vowels are easily caused to be silent, a person has to be careful in speaking such vowels to make them correspond to those of the known speech signal.

In a third prior art speech segmentation apparatus, the segmentation points of speech elements are automatically determined by using a hidden Markov model (HMM).

In the above-described third prior art speech segmentation apparatus, however, since the time limitation is loose, the accuracy of segmentation points around boundaries between speech elements is low. Although the accuracy of segmentation points can be enhanced by learning a highly accurate reference speech signal of a specific person, such a highly-accurate reference speech signal is not easy to obtain.

SUMMARY OF THE INVENTION

It is an object of the present invention to provide a method and apparatus for performing a speech segmentation capable of enhancing the performance of determination of segmentation points.

According to the present invention, in a method for performing a segmentation operation upon a synthesizing speech signal and an input speech signal, a synthesized speech signal and a speech element duration signal are generated from the synthesizing speech signal. A first feature parameter is extracted from the synthesized speech signal, and a second feature parameter is extracted from the input speech signal. A dynamic programming matching operation is performed upon the second feature parameter with reference to the first feature parameter and the speech element duration signal to obtain segmentation points of the input speech signal.

BRIEF DESCRIPTION OF THE DRAWINGS

The present invention will be more clearly understood from the description set forth below, with reference to the accompanying drawings, wherein:

FIG. 3 is a flowchart for explaining the operation of the DP matching unit 331 of FIG. 2;

DESCRIPTION OF THE PREFERRED EMBODIMENT

Figure 1:
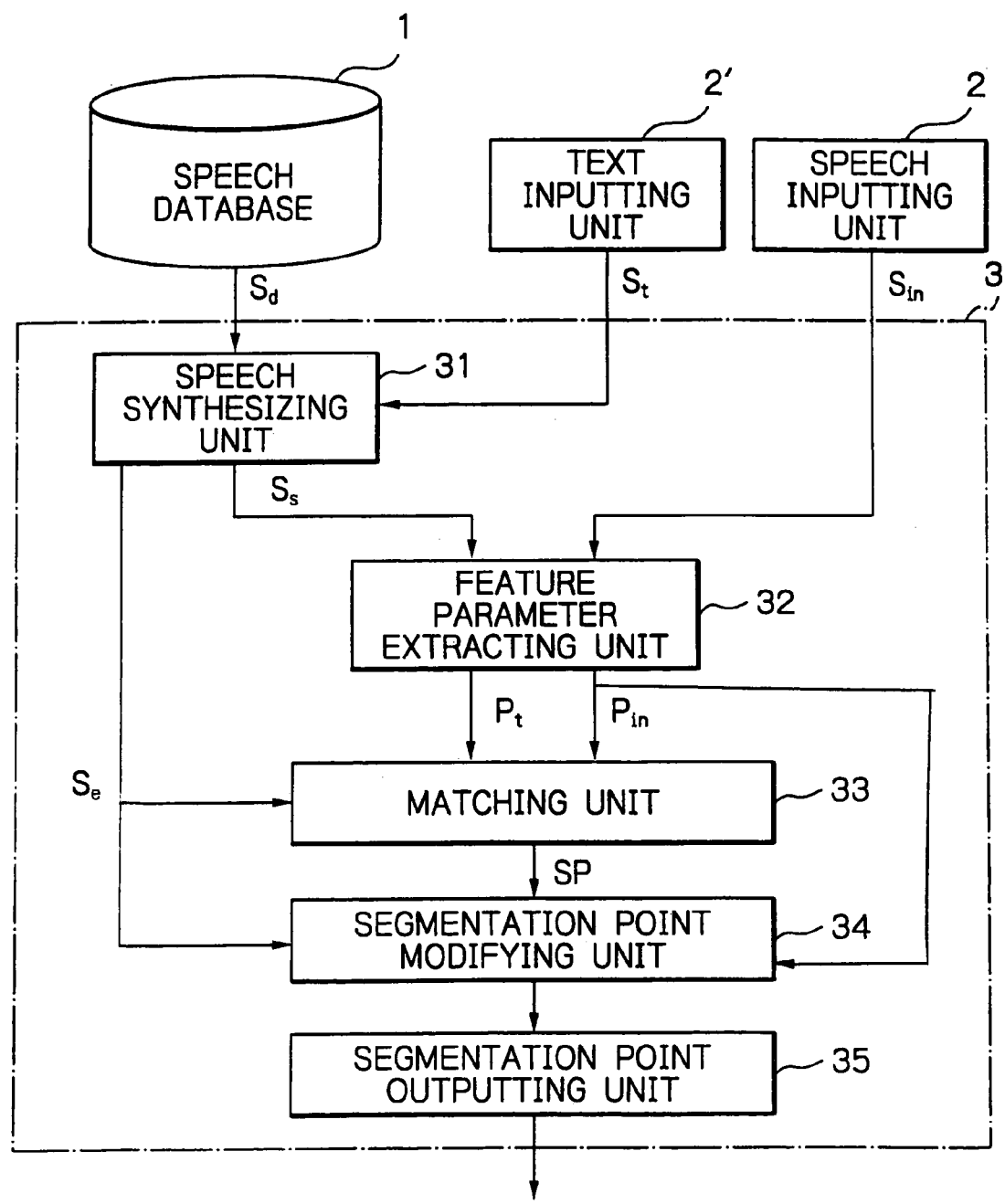
FIG. 1 is a block circuit diagram illustrating an embodiment of the speech segmentation apparatus according to the present invention.

In FIG. 1, which illustrates an embodiment of the speech segmentation apparatus according to the present invention, reference numeral 1 designates a speech database for storing known speech signals of the voice of a specific person in advance, 2 designates a speech inputting unit for inputting an input speech signal of an unknown speech signal of a person to generate an input speech signal $S_{in}$, and 2' designates a text inputting unit for inputting a text to generate a text signal $S_t$. In this case, the speech elements of the text signal $S_t$ are the same as those of the input speech signal $S_{in}$. A speech segmentation apparatus 3 receives a speech signal $S_d$ from the speech database 1 in accordance with the text signal $S_t$ and the input speech signal $S_{in}$ from the speech inputting unit 2. In this case, since the speech elements of the speech signal $S_d$ are the same as those of the text signal $S_t$, the speech elements of the speech signal $S_d$ are the same as those of the input speech signal $S_{in}$.

The speech segmentation apparatus 3 of FIG. 1 is constructed by a speech synthesizing unit 31, a feature parameter extracting unit 32, a matching unit 33, a segmentation point modifying unit 34 and a segmentation point outputting unit 35.

When the speech synthesizing unit 31 receives the speech signal $S_d$ in accordance with the text signal $S_t$, the speech synthesizing unit 31 generates a synthesized speech signal $S_s$ and a speech element duration signal $S_e$, and transmits the synthesized speech signal $S_s$ and the speech element duration signal $S_e$ to the feature parameter extracting unit 32 and the matching unit 33, respectively.

The feature parameter extracting unit 32 extracts a speech feature parameter $P_t$ from the synthesized speech signal $S_s$ and an input feature parameter $P_{in}$ from the input speech signal $S_{in}$ at every predetermined time period. For example, each of the feature parameters $P_t$ and $P_{in}$ is a filter bank output, i.e., power spectrum or the like.

The matching unit 33 performs a dynamic programming (DP) matching operation upon the feature parameters $P_t$ and $P_{in}$ in correspondence with the speech element duration signal $S_e$, thereby obtaining segmentation points SP. The segmentation points SP are modified by the segmentation point modifying unit 34 and are outputted by the segmentation point outputting unit 35.

Note that the segmentation point modifying unit 34 determines whether or not the change of the input feature parameter $P_{in}$ is larger than a definite value in accordance with the speech element duration signal $S_e$. As a result, only when the change of the input feature parameter $P_{in}$ is larger than the definite value, is the corresponding segmentation point moved to a point (time) where the change of the input feature parameter $P_{in}$ is larger than the definite value.

Figure 2:
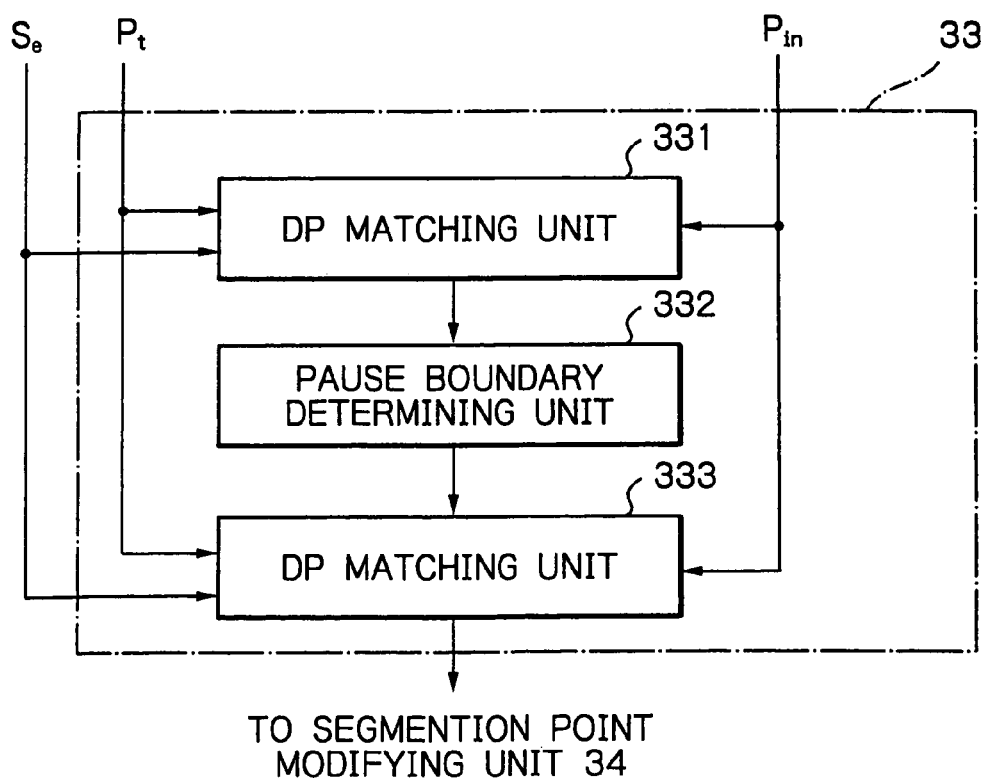
FIG. 2 is a detailed block circuit diagram of the matching unit of FIG. 1.

In FIG. 2, which is a detailed block circuit diagram of the matching unit 33 of FIG. 1, the matching unit 33 is constructed by a DP matching unit 331, a pause boundary determining unit 332 and a DP matching unit 333. The DP matching unit 331 performs a DP matching operation upon the entirety of the feature parameters $P_t$ and $P_{in}$, while the DP matching unit 333 performs a DP matching operation upon each of the non-paused intervals of the feature parameters $P_t$ and $P_{in}$.

Figures 4A, 4B:
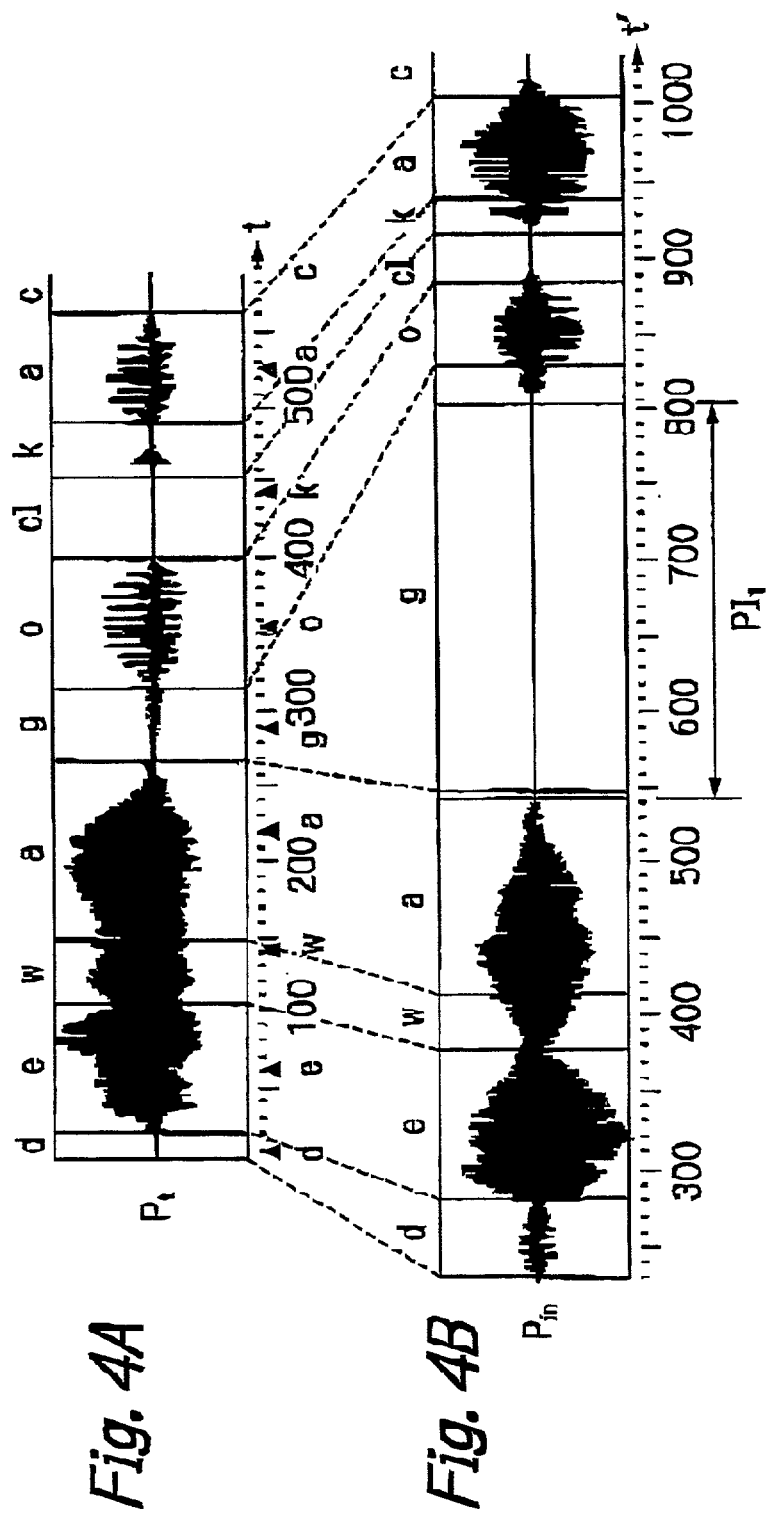
FIG. 4A is a timing diagram showing the speech feature parameter of FIG. 2 for explaining the flowchart of FIG. 3.
FIG. 4B is a timing diagram showing the input feature parameter of FIG. 2 for explaining the flowchart of FIG. 3.

The operation of the DP matching unit 331 of FIG. 2 will be explained next with reference to a flowchart as illustrated in FIG. 3. Here, the speech feature parameter $P_t$ is assumed to be changed in accordance with a coordinate t as illustrated in FIG. 4A, and the input feature parameter $P_{in}$ is assumed to be changed in accordance with a coordinate t' as illustrated in FIG. 4B. Both of the feature parameters show the same sequence of speech elements "d", "e", "w", "a", . . . , First, at step 301, it is determined whether or not there are paused intervals in the input feature parameter $P_{in}$ where $P_{in}$<TH (threshold value). Only if there are paused intervals such as $PI_i$ as indicated in FIG. 4B, does the control proceed to steps 302 and 303. Otherwise, the control proceeds directly to step 304.

Figure 5A:
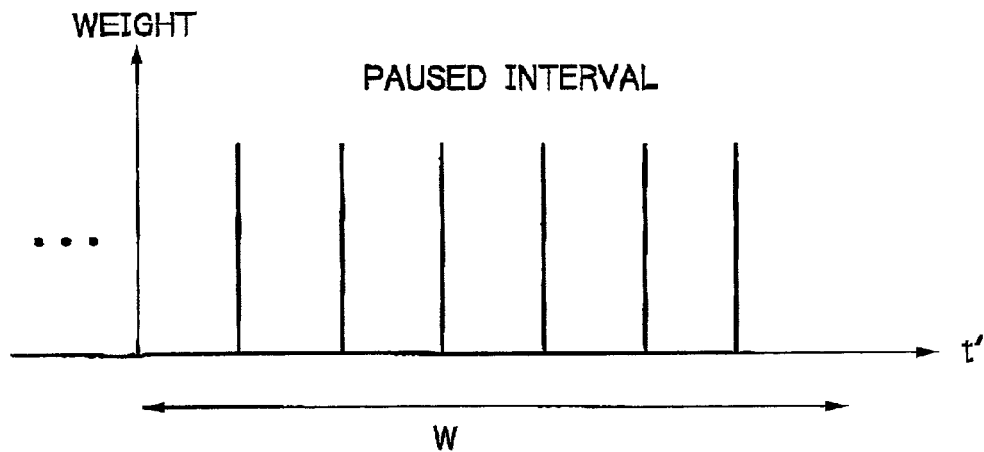
FIG. 5A is a timing diagram showing the searched path width and weight in the paused intervals of the input feature parameter of FIG. 2.

At step 302, a searched path width W of the input feature parameter $P_{in}$ having a coordinate t' is made infinite in the paused intervals as illustrated in FIG. 5A. Also, at step 303, a weight of the input feature parameter $P_{in}$ is made definite in the paused intervals as illustrated in FIG. 5A.

Figure 5B:
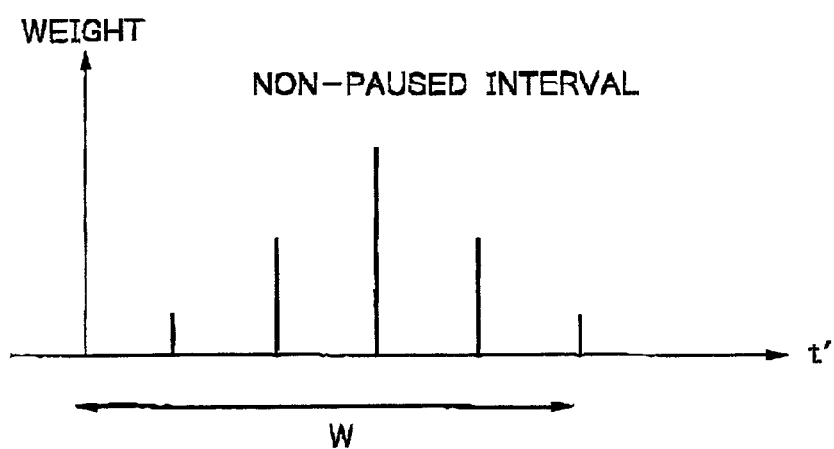
FIG. 5B is a timing diagram showing the searched path width and weight in the non-paused intervals of the input feature parameter of FIG. 2.

At step 304, the searched path width W of the input feature parameter $P_{in}$ for the non-paused intervals are finite as illustrated in FIG. 5B. Also, at step 305, the weight of the input feature parameter $P_{in}$ for the non-paused intervals is indefinite.

At step 306, a DP matching operation is performed upon the speech feature parameter $P_t$ and the input feature parameter $P_{in}$ using the path width and the weight made at steps 302 to 305, to obtain segmentation points.

Next, at step 307, the result of the DP matching operation is made correspondent to the speech element duration signal $S_e$. That is, as illustrated in FIG. 4B, speech elements "d", "e", "w", . . . are allocated to the input feature parameter $P_{in}$.

Next, at step 308, the DP matching result including only the paused intervals and the segmentation points close thereto are outputted to the pause boundary determining unit 332. In this case, the other information of the DP matching result is scrapped.

Thus, the flowchart of FIG. 3 is completed by step 309.

Figure 6:
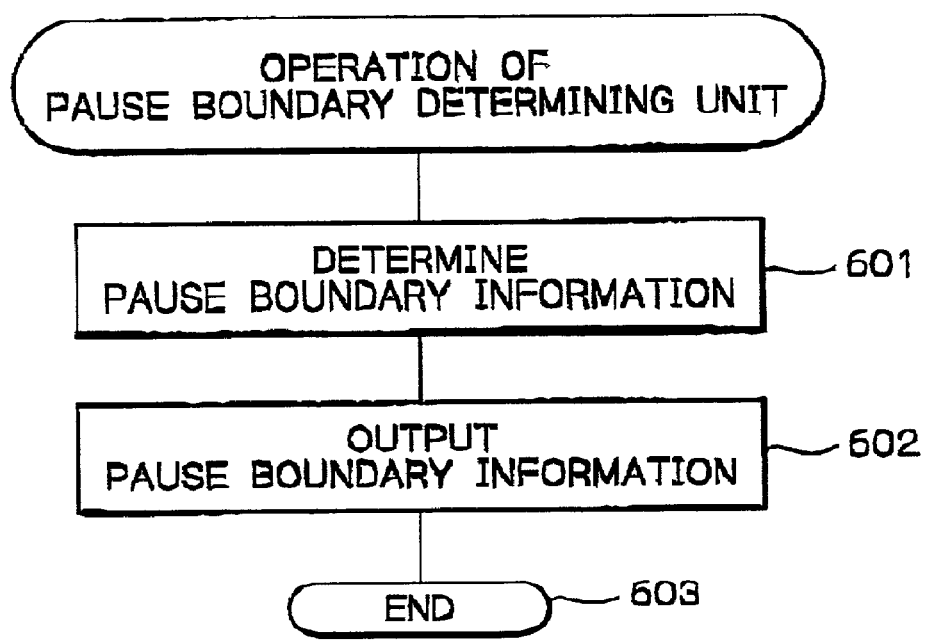
FIG. 6 is a flowchart for explaining the operation of the pause boundary determining unit of FIG. 2.

The operation of the pause boundary determining unit 332 of FIG. 2 will be explained next with reference to FIG. 6 The flowchart of FIG. 6 is started by receiving the result of the DP matching operation from the DP matching unit 321.

First, at step 601, pause boundary information is determined in accordance with the paused intervals and the segmentation points close thereto.

Next, at step 602, the pause boundary information is outputted to the DP matching unit 333.

Thus, the flowchart of FIG. 6 is completed by step 603.

Figure 7:
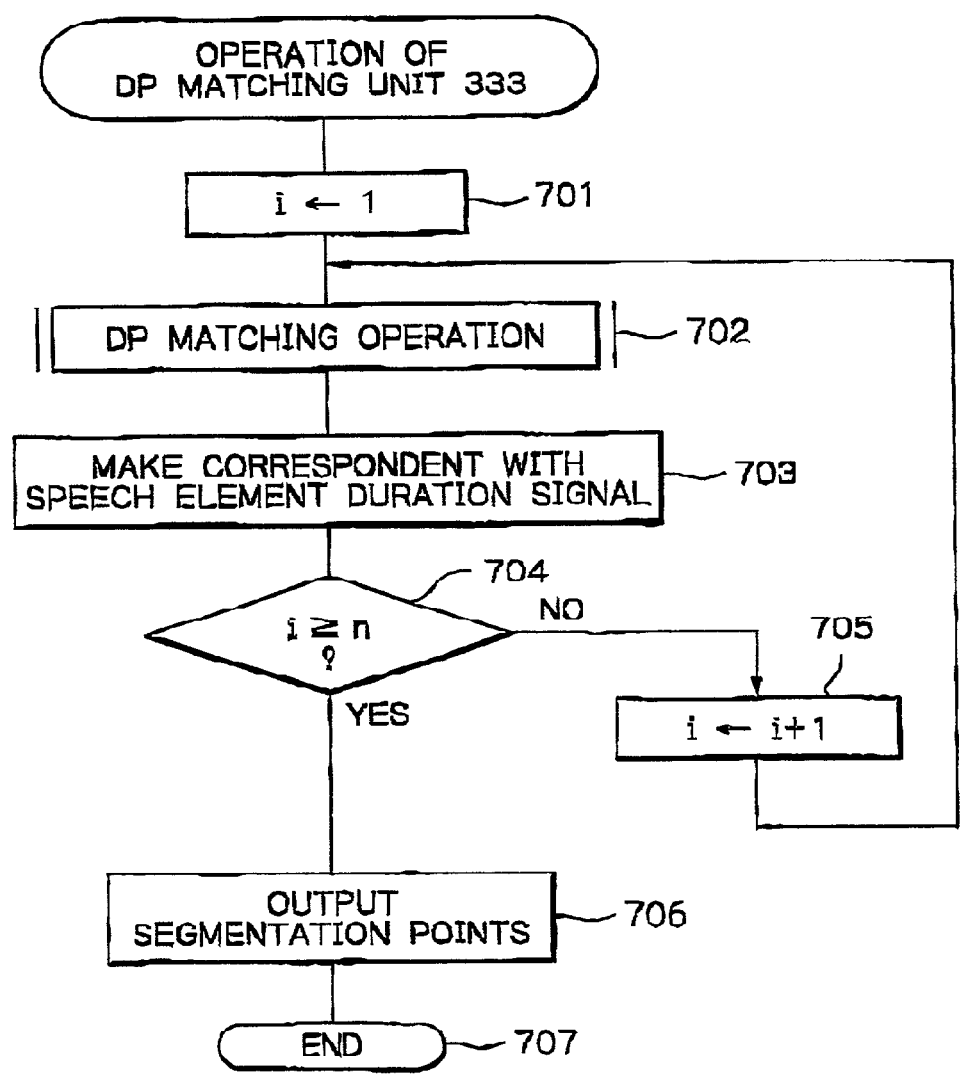
FIG. 7 is a flowchart for explaining the operation of the DP matching unit 333 of FIG. 2.

The operation of the DP matching unit 333 of FIG. 2 will be explained next with reference to FIG. 7. The flowchart of FIG. 7 is started by receiving the pause boundary information from the pause boundary determining unit 332. Here, the number of pause boundaries is "n".

First, at step 701, a value i is initialized, i.e., i←1

At step 702, a DP matching operation is performed upon the speech feature parameter $P_t$ and the input feature parameter $P_{in}$ using the path width and the weight as illustrated in FIG. 5B, to obtain segmentation points before the boundary of the paused interval $PI_i$.

Next, at step 703, the result of the DP matching operation is made correspondent to the speech element duration signal $S_e$.

Figure 8:
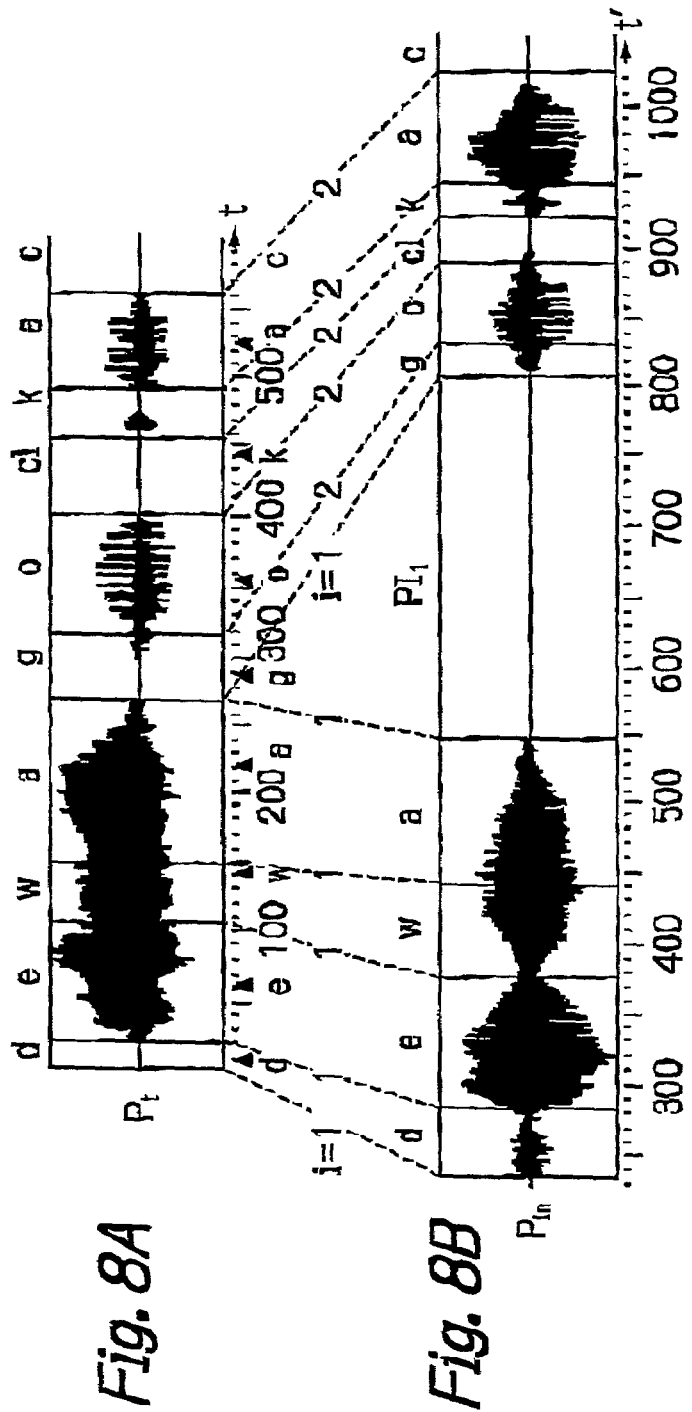
FIG. 8A is a timing diagram showing the speech feature parameter of FIG. 2 for explaining the flowchart of FIG. 7.
FIG. 8B is a timing diagram showing the input feature parameter of FIG. 2 for explaining the flowchart of FIG. 7.

That is, as illustrated in FIG. 8B, if i=1, speech elements "d", "e", "w", and "a" are allocated to the input feature parameter $P_{in}$. Also, if i=2, speech elements "g", "o", "cl", "k", and "c" are allocated to the input feature parameter $P_{in}$.

Next, at step 704, it is determined whether or not i≧n is satisfied. When i<n, the control proceeds to step 705 which increases i by +1, thus repeating the operations at steps 702 to 704. Otherwise, i.e., if i≧n, the control proceeds to step 706.

At step 706, the segmentation points are outputted to the matching point modifying unit 34.

Thus, the flowchart of FIG. 7 is completed by step 707.

Figure 9:
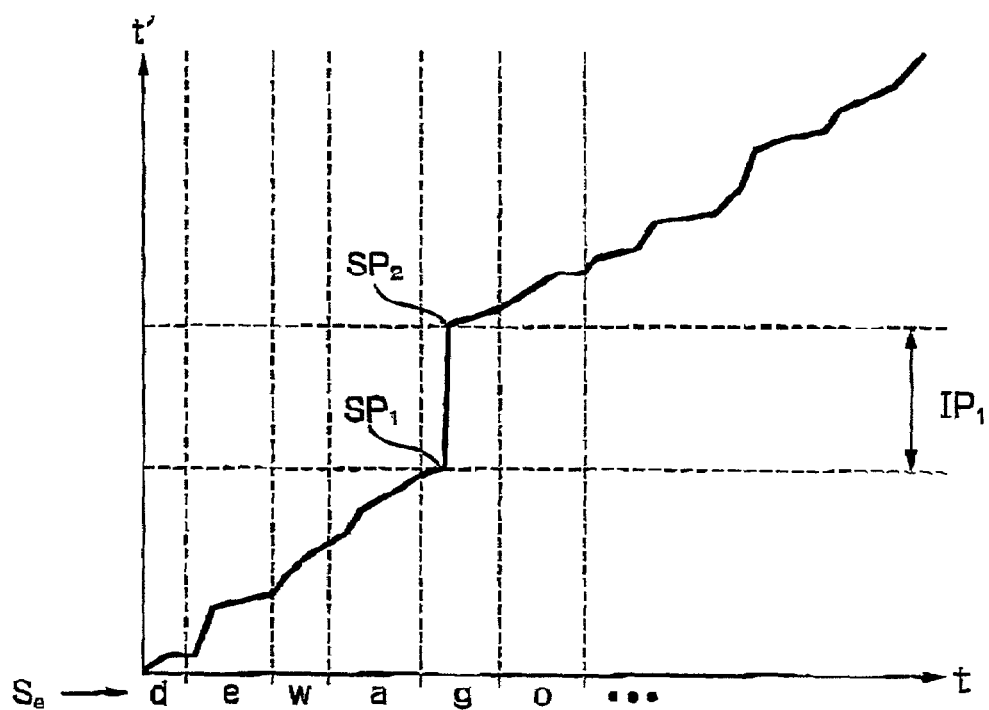
FIG. 9 is a diagram showing the DP matching result of the DP matching unit 331 of FIG. 2.

In FIG. 9, which illustrates the DP matching result of the DP matching unit 331 of FIG. 2, since the searched path width W is made infinite (see step 302 of FIG. 3) and the weight is definite (see step 303 of FIG. 3), if no paused interval is allocated to the speech feature parameter $P_t$, only two segmentation points such as $SP_1$ and $SP_2$ are allocated to one paused interval of the input feature parameter $P_{in}$.

The operation of the DP matching unit 333 of FIG. 2 for determining a silent speech element of the input feature parameter $P_{in}$ will be explained next with reference to FIG. 10 as well as FIG. 11 which shows the DP matching result of the DP matching unit 333.

Figure 10:
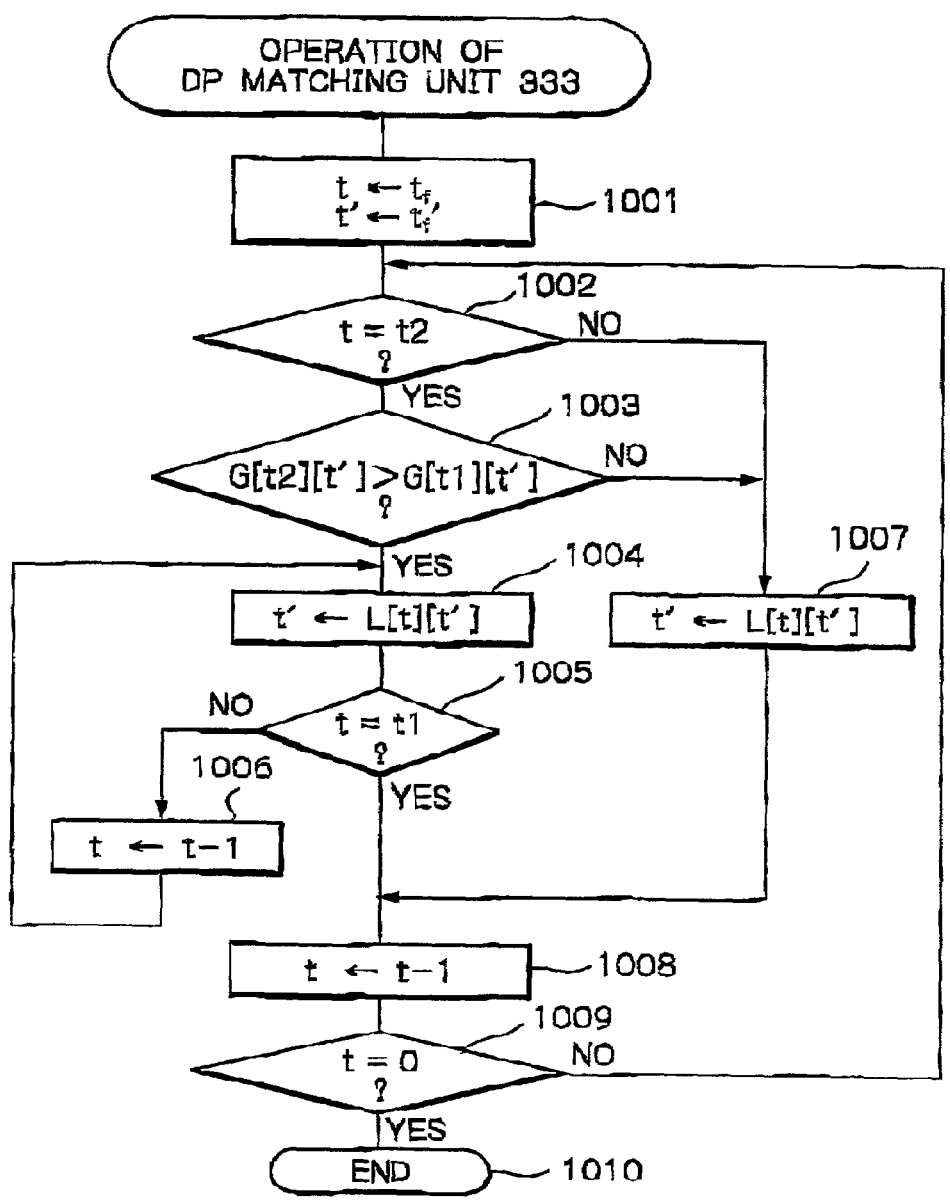
FIG. 10 is another flowchart for explaining the operation of the DP matching unit 333 of FIG. 2.
Figure 11:
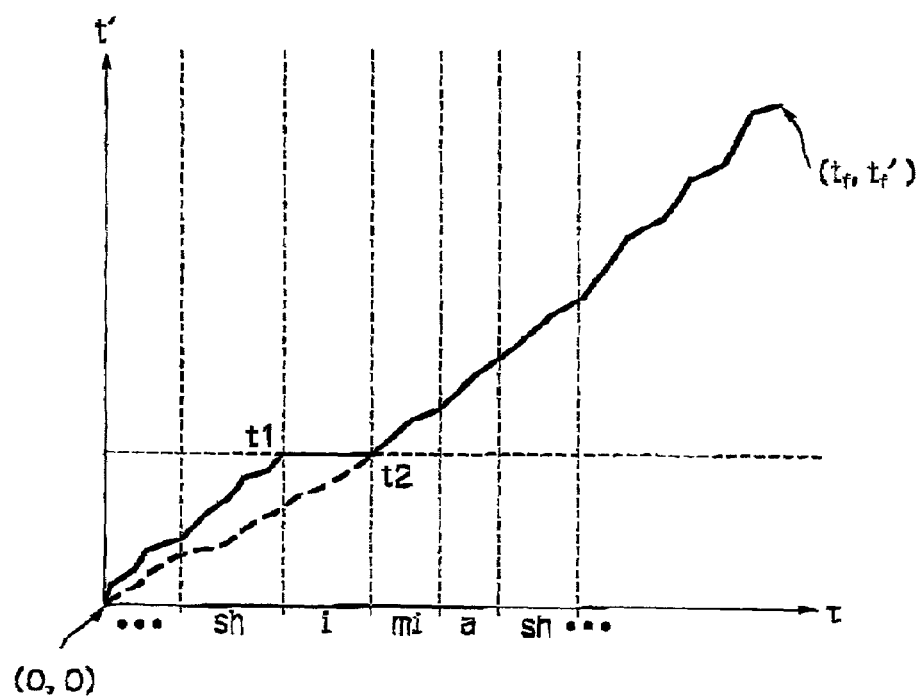
FIG. 11 is a diagram showing the DP matching result of the DP matching unit 333 of FIG. 2.

In FIG. 11, a speech element "i" is assumed to be easily caused to be silent, and a start timing t1 and an end timing t2 of the speech element "i" are stored in advance. Also, in FIG. 10, the following values are defined:

t: time of the speech feature parameter $P_t$;

t': time of the input feature parameter $P_{in}$;

L[t][t']: time of the input feature parameter $P_{in}$ where the distance between (t, t') and (t−1, L[t][t']) is minimum; and G[t][t']: weight distance of an optimum path from (t, t') to (o,o).

First, at step 1001, time t and time t' are initialized, i.e., $$t \leftarrow t_f$$

$$t' \leftarrow t_f'$$

where $t_f$ and $t_f'$ are final times of the speech feature parameter $P_t$ and the input feature parameter $P_{in}$.

Next, at step 1002, it is determined whether or not t=t2 is satisfied. Only if t=tZ, does the control proceed to step 1003 which determines whether or not G[tZ][t']>G [t1][t'] is satisfied. Otherwise, i.e., if t≠t2, the control proceeds to step 1007.

At step 1003, if G[t2][t']>G[t1][t'], the control proceeds to step 1004 in which $$t' \leftarrow L[t][t']$$

The operation at step 1004 is repeated by steps 1005 and 1006 until t reaches t1.

On the other hand, at step 1003, if G[t2][t']≦G[t1][t'], the control proceeds to step 1007.

At step 1007, $$t' \leftarrow L[t][t']$$

The operation at step 1002 to 1007 are repeated by steps 1008 and 1009 until t reaches 0.

Thus, the flowchart of FIG. 10 is completed by step 1010.

In FIG. 11, when the determination at step 1003 is affirmative, an optimum path is indicated by a solid line where the speech element "i" is caused to be silent. On the other hand, when the determination at step 1003 is negative, an optimum path is indicated by a dotted line where the speech element "i" is caused to be not silent.

In summary, weight distances of all the paths at times t1 and t2 are stored in advance. Then, when searching an optimum path, the distance at time t2 is compared with the distance at time t1. As a result, when the distance at time t2 is large then the distance at time t1, an optimum path is linked between a time of the input feature parameter $P_{in}$ corresponding to t2 and the same time of the input feature parameter $P_{in}$ corresponding to t1. On the other hand, then the distance at time t2 is smaller than the distance at time t1, searching of an optimum path is carried out in a usual manner.

Note that, if the speech element "i" of the input feature parameter $P_{in}$ is silent, the speech element "i" (vowel) of the input feature parameter $P_{in}$ is matched with the speech element "i" and its immediate preceding silent speech element "sh" (consonant) of the speech feature parameter $P_t$. Generally, a silent consonant plus a vowel which is easily caused to be silent is longer than a vowel which is easily caused to be silent. Therefore, when carrying out a DP matching operation by the DP matching unit 323, the searched path width is caused to be increased.

Figure 12:
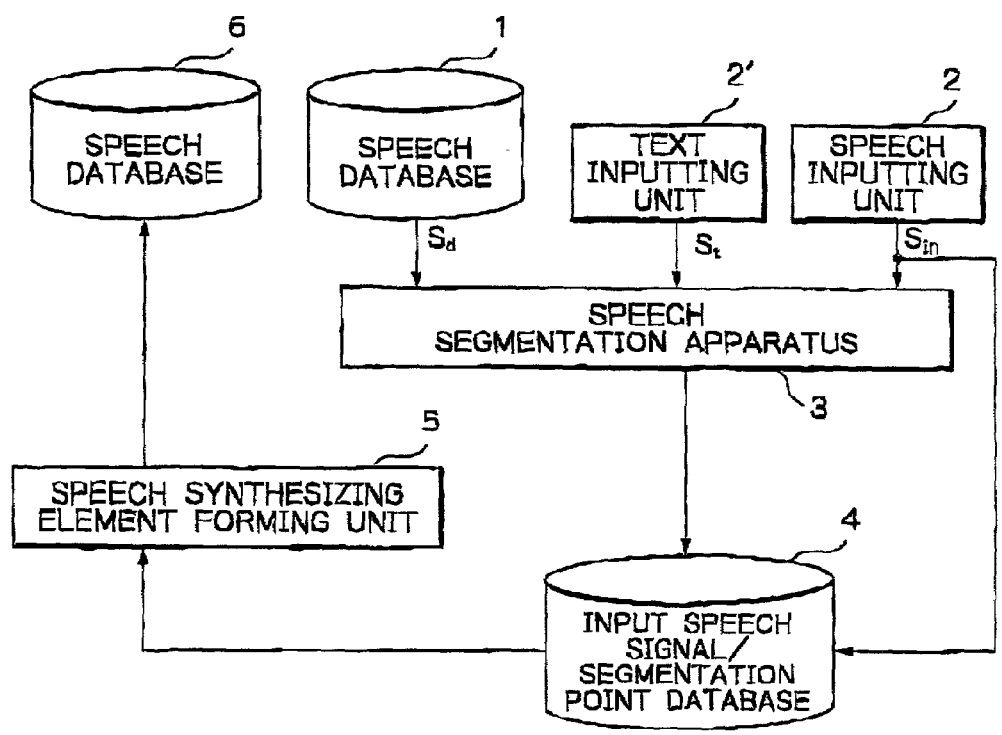
FIG. 12 is a block circuit diagram illustrating a speech corpus forming apparatus for speech synthesizing to which the speech segmentation apparatus of FIG. 1 is applied.

In FIG. 12, which illustrates a speech corpus forming apparatus for speech synthesizing to which the speech segmentation apparatus of FIG. 1 is applied, the input speech signal $S_{in}$ from the speech inputting unit Z and the segmentation points from the speech segmentation apparatus 3 are stored in an input speech signal/segmentation points database 4. A speech synthesizing element forming unit 5 forms speech synthesizing elements in accordance with the input speech signal $S_{in}$ and the segmentation points stored in the input speech signal/segmentation point database 4, and stores the speech synthesizing element in a speech database 6.

Figure 13:
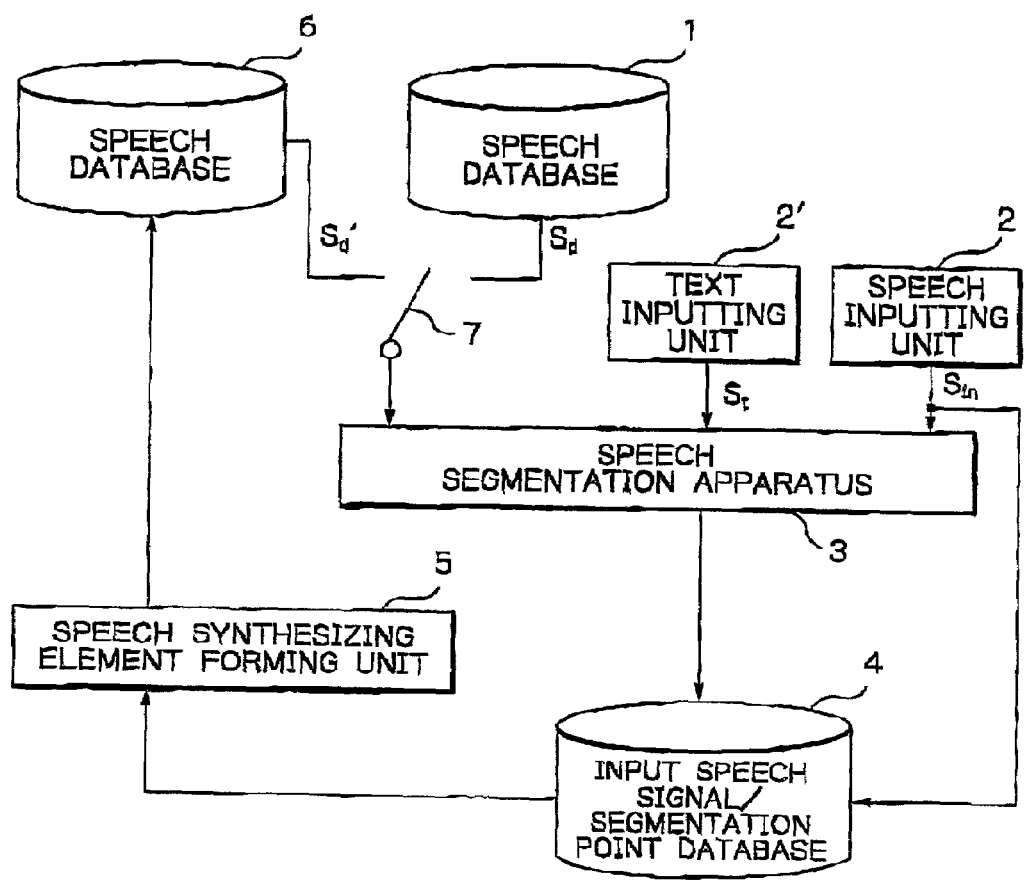
FIG. 13 is a block circuit diagram illustrating another speech corpus forming apparatus for speech synthesizing to which the speech segmentation apparatus of FIG. 1 is applied.

In FIG. 13, which illustrates another speech corpus forming apparatus for speech synthesizing to which the speech segmentation apparatus of FIG. 1 is applied, a switch 7 is added to the elements of FIG. 12, so that speech synthesizing elements in the speech database 6 are selectively supplied as a speech signal $S_d'$ to the speech segmentation apparatus 3.

The operation of the apparatus of FIG. 13 will be explained next with reference to FIG. 14. Here, the number of voices to be segmented is assumed to be "n".

First, at step 1401, a value i is initialized, i.e., $$i \leftarrow 1$$

Next, at step 1402, it is determined whether or not a voice $V_i$ is present in the speech database 6. Only if the voice $V_i$ is present in the speech database 6, does the control proceeds to step 1403 which performs a DP matching operation upon the voice $V_i$ of the input speech signal $S_{in}$ and the voice $V_i$ stored in the speech database 6. Otherwise, i.e., if the speech $V_i$ is not present in the speech database 6, the control proceed to step 1404 which performs a DP matching operation upon the speech $V_i$ of the input speech signal $S_{in}$ and the voice $V_i$ stored in the speech database 1.

The DP matching result at steps 1403 and 1403 are stored in the input speech signal/segmentation point database 4.

The operations at steps 1402, 1403 and 1404 are repeated by steps 1405 and 1406 until i reaches n.

At step 1407, the speech synthesizing element forming unit 5 forms speech synthesizing elements in accordance with the input speech signal $S_{in}$ and the segmentation points stored in the input speech signal/segmentation point database 4, and then, stores the speech synthesizing elements in the speech database 6.

At step 1408, it is determined whether or not the renewed matching result, i.e., the renewed segmentation points in the input speech signal/segmentation point database 4 are close to those which are previously stored therein.

The operations at steps 1401 to 1407 are repeated until the renewed segmentation points are close to the corresponding previously-stored segmentation points. In other words, the segmentation points are converged.

Figure 14:
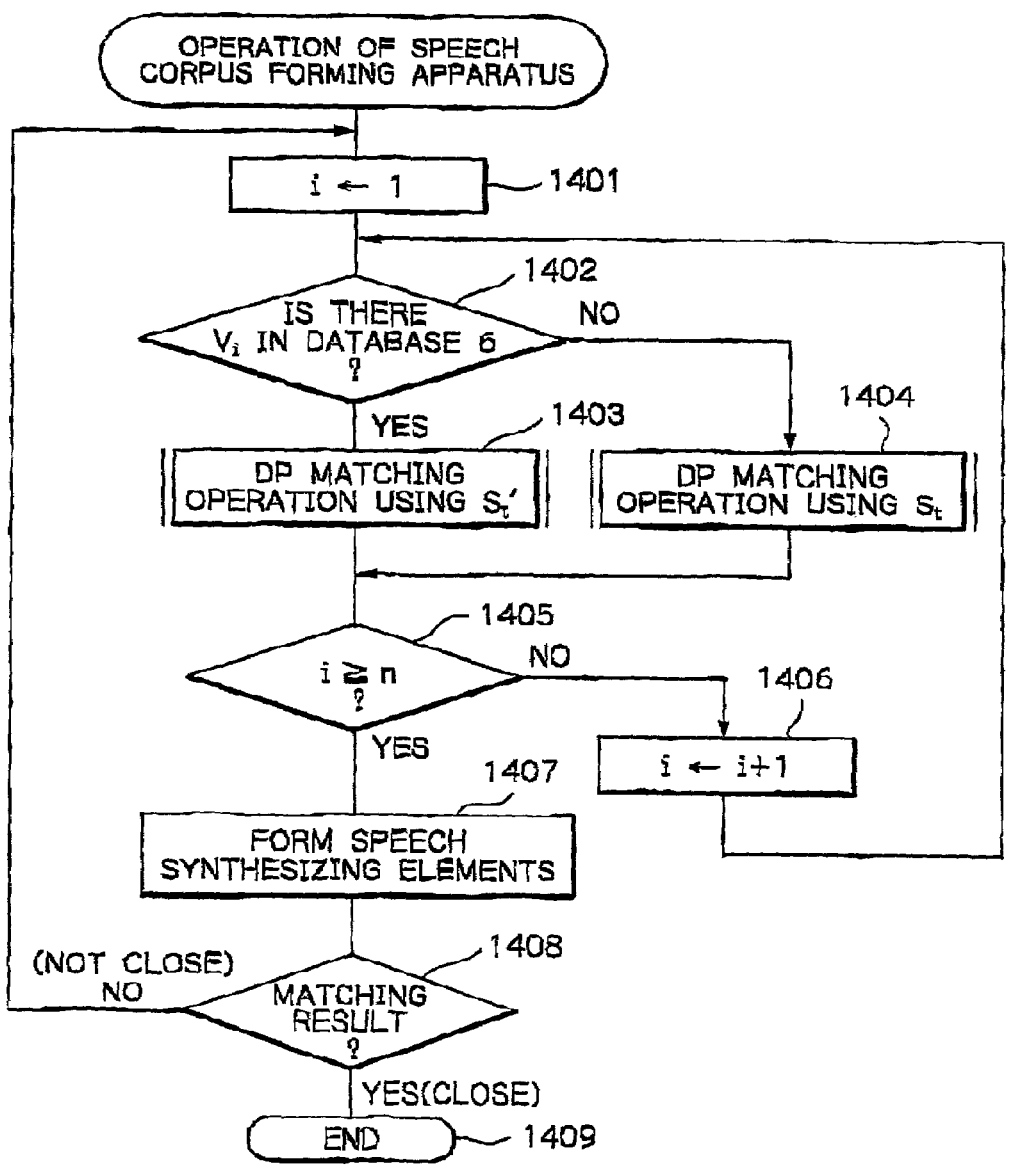
FIG. 14 is a flowchart for explaining the operation of the apparatus of FIG. 13.

Thus, the flowchart of FIG. 14 is completed by step 1409.

As explained hereinabove, according to the present invention, the accuracy of determination of segmentation points can be enhanced.

What is claimed is:

1. A method for performing a segmentation operation upon a synthesizing speech signal and an input speech signal, comprising the steps of:

generating a synthesized speech signal and a speech element duration signal from said synthesizing speech signal;

extracting a first feature parameter from said synthesized speech signal;

extracting a second feature parameter from said input speech signal; and performing a dynamic programming matching operation upon said second feature parameter with reference to said first feature parameter and said speech element duration signal to obtain segmentation points of said input speech signal.

2. The method as set forth in claim 1, wherein said synthesizing speech signal includes no paused intervals, said dynamic programming matching operation performing step comprising the steps of:
   determining whether or not there are paused intervals in said second feature parameter; and
   controlling a searched path width and weight of said second feature parameter for said dynamic programming operation in said paused intervals when there are said paused intervals in said second feature parameter.

3. The method as set forth in claim 2, wherein said dynamic programming matching operation performing step further comprises a step of determining pause boundaries in accordance with said paused intervals and said segmentation points close thereto.

4. The method as set forth in claim 3, wherein said dynamic programming matching operation performing step comprises a step of performing a further dynamic programming matching operation upon said second feature parameter partitioned by said paused intervals in accordance with said first feature parameter and said speech element duration signal.

5. The method as set forth in claim 4, wherein said further dynamic programming matching operation performing step comprises the steps of:
   storing a start time and an end time of a possible silent vowel of said first feature parameter;
   comparing a weight distance of a path from zero time to said start time with a weight distance of a path from said zero time to said end time; and
   determining whether or not a vowel of said second feature parameter corresponding to said possible silent vowel of said first feature parameter is silent in accordance with a result of said comparing step.

6. The method as set forth in claim 5, wherein said further dynamic programming matching operation performing step increases a searched path width of said first feature parameter in an interval where the vowel of said second feature parameter is determined to be silent.

7. The method as set forth in claim 3, further comprising a step of modifying said segmentation points in accordance with a change of said second feature parameter in specific boundaries.

8. The method as set forth in claim 1, further comprising the steps of:
   forming speech synthesizing elements in accordance with said input speech signal and said segmentation points; and
   storing said speech synthesizing elements, said synthesized speech signal/speech element duration generating step generating said synthesized speech signal and said speech element duration signal from said stored speech synthesizing elements, said dynamic programming matching operation performing step performing said dynamic matching operation until said segmentation points are converged.

9. An apparatus for performing a segmentation operation upon a synthesizing speech signal and an input speech signal, comprising:
   a speech synthesizing unit for generating a synthesized speech signal and a speech element duration signal from said synthesizing speech signal;
   a feature parameter extracting unit for extracting a first feature parameter from said synthesized speech signal and extracting a second feature parameter from said input speech signal; and
   a matching unit for performing a dynamic programming matching operation upon said second feature parameter with reference to said first feature parameter and said speech element duration signal to obtain segmentation points of said input speech signal.

10. The apparatus as set forth in claim 9, wherein said synthesizing speech signal includes no paused intervals, said matching unit comprising:
    means for determining whether or not there are paused intervals in said second feature parameter; and
    means for controlling a searched path width and weight of said second feature parameter for said dynamic programming operation in said paused intervals when there are said paused intervals in said second feature parameter.

11. The apparatus as set forth in claim 10, wherein said matching unit further comprises means for determining pause boundaries in accordance with said paused intervals and said segmentation points close thereto.

12. The apparatus as set forth in claim 11, wherein said matching unit comprises a further matching unit for performing a further dynamic programming matching operation upon said second feature parameter partitioned by said paused intervals in accordance with said first feature parameter and said speech element duration signal.

13. The apparatus as set forth in claim 12, wherein said further matching unit comprises:
    means for storing a start time and an end time of a possible silent vowel of said first feature parameter;
    means for comparing a weight distance of a path from a zero time to said start time with a weight distance of a path from said zero time to said end time; and
    means for determining whether or not a vowel of said second feature parameter corresponding to said possible silent vowel of said first feature parameter is silent in accordance with a result of said comparing means.

14. The apparatus as set forth in claim 13, wherein said further matching unit increases a searched path width of said first feature parameter in an interval where the vowel of said second feature parameter is determined to be silent.

15. The apparatus as set forth in claim 11, further comprising a segmentation point modifying unit for modifying said segmentation points in accordance with a change of said second feature parameter in specific boundaries.

16. The apparatus as set forth in claim 9, further comprising:
    a speech synthesizing element forming unit for forming speech synthesizing elements in accordance with said input speech signal and said segmentation points; and
    a storing unit for storing said speech synthesizing elements, said speech synthesizing unit generating said synthesized speech signal and said speech element duration signal from said stored speech synthesizing elements, said matching unit performing said dynamic programming matching operation until said segmentation points are converged.

* * * * *